(12) United States Patent
Thomas et al.

(10) Patent No.: US 12,582,256 B2
(45) Date of Patent: Mar. 24, 2026

(54) JUICER

(71) Applicant: BREVILLE PTY LIMITED, Alexandria (AU)

(72) Inventors: Mark Anthony Thomas, Alexandria (AU); Sebastien Tiburzio, Alexandria (AU)

(73) Assignee: BREVILLE PTY LIMITED, Alexandria (AU)

( * ) Notice: Subject to any disclaimer, the term of this patent is extended or adjusted under 35 U.S.C. 154(b) by 789 days.

(21) Appl. No.: 17/802,844

(22) PCT Filed: Feb. 26, 2021

(86) PCT No.: PCT/AU2021/050166
§ 371 (c)(1),
(2) Date: Aug. 26, 2022

(87) PCT Pub. No.: WO2021/168515
PCT Pub. Date: Sep. 2, 2021

(65) Prior Publication Data
US 2023/0121117 A1 Apr. 20, 2023

(30) Foreign Application Priority Data

Feb. 28, 2020 (AU) ................................. 2020900579

(51) Int. Cl.
*A47J 19/02* (2006.01)
*A47J 19/06* (2006.01)

(52) U.S. Cl.
CPC ............. *A47J 19/027* (2013.01); *A47J 19/06* (2013.01)

(58) Field of Classification Search
CPC .......... A47J 19/027; A47J 19/06; A47J 42/04; A47J 42/46; A47J 42/14; A47J 42/40; A47J 42/00; A47J 42/50; A47J 43/046
(Continued)

(56) References Cited

U.S. PATENT DOCUMENTS 9,565,872 B2 2/2017 Corkin et al.
10,334,979 B2 7/2019 Barquin et al.
(Continued)

FOREIGN PATENT DOCUMENTS

EP 1885223 B1 12/2013
JP S50-53484 U 5/1975
(Continued)

OTHER PUBLICATIONS

Extended European Search Report (EESR) for corresponding EP Application No. 21761889.1, dated Feb. 7, 2024, 7 pgs.
(Continued)

*Primary Examiner* — Phuong T Nguyen
(74) *Attorney, Agent, or Firm* — Tarolli, Sundheim, Covell & Tummino LLP

(57) ABSTRACT
A juicer for juicing fruit and vegetable products has a motorised base, and a collection container received by said base. The container has an opening and a lid to close the opening. The container has an inner juice chamber and an outer pulp chamber that at least partially surrounds the inner juice chamber. The inner juice chamber provides a wall portion at least partially separates the inner juice chamber. A filter basket is located within the container to receive the fruit and vegetable product. The filter basket is rotatable about a central axis and has a grating disc portion and a sieve portion.

19 Claims, 9 Drawing Sheets

(58) Field of Classification Search
USPC ........... 99/326–335, 348, 468, 492, 509–511
See application file for complete search history.

(56)                References Cited

U.S. PATENT DOCUMENTS

| | | | | |
|---|---|---|---|---|
| 2007/0107609 | A1* | 5/2007 | Barker ................. | A47J 43/255 |
| | | | | 99/509 |
| 2010/0139504 | A1* | 6/2010 | Wu Chang .......... | A47J 43/0788 |
| | | | | 241/282.1 |
| 2017/0095122 | A1 | 4/2017 | Hoare et al. | |

FOREIGN PATENT DOCUMENTS

| | | | |
|---|---|---|---|
| JP | S50-117193 | U | 9/1975 |
| JP | S50-117973 | A | 9/1975 |
| JP | S50-137395 | U | 11/1975 |
| JP | S51-55890 | U | 4/1976 |
| JP | S51-82790 | U | 7/1976 |
| WO | 2015/039166 | A1 | 3/2015 |

OTHER PUBLICATIONS

International Search Report and Written Opinion issued in connection with corresponding PCT Patent Application No. PCT/AU2021/050166 dated May 3, 2021.

* cited by examiner

JUICER

RELATED APPLICATIONS

The present invention is a U.S. National Stage under 35 USC 371 patent application, claiming priority to Serial No. PCT/AU2021/050166, filed on Feb. 26, 2021, which claims priority from Australian Patent Application No. 2020900579 filed on Feb. 28, 2020; the entireties of both are hereby incorporated herein by reference.

FIELD

The present invention relates to a juicer, and more particularly to a juicer for extracting juice from fruit and vegetables.

The invention has been developed primarily for use as a juicer for fruit and vegetables and will be described hereinafter with reference to this application. However, it will be appreciated that the invention is not limited to this particular field of use. For example, the invention may be for use as blender, or for a combination juicer and blender.

BACKGROUND

Juicers for fruit and vegetable products are known. Such juicers typically comprise a base having a drive mechanism, a container that receives a lid having a feed tube, and a grating disc that is driven by the drive mechanism. Fruit and/or vegetable products are inserted through the feed tube to contact the grating disc, which is rotated by the drive mechanism to grate or shred the fruit and/or vegetable products. The resultant product is a mixture of substantially solid products (i.e. the pulp) and liquid products (i.e. the juice). The juice is then extracted and dispensed, through a spout outlet in the container, and into a separate container (e.g. a jug or glass) for consumption.

Known juicers are typically constructed with a low spout outlet, whereby the distance between the spout outlet and the feet of the juicer base is relatively small, allowing only smaller containers (accommodating a volume of about 1 L or less) or short glasses to be used for collecting juice. Disadvantageously, such smaller containers or short glasses will become filled up quite quickly, and once full, they need to be emptied before further juicing can be performed. This may be cumbersome for the user. Other known juicers that allow for high-volume juicing have a disadvantage of a large footprint or overall height of the juicer, thus taking up more space, and also typically require the use of multiple components that are cumbersome to clean.

SUMMARY

It is an object of the present invention to substantially overcome, or at least ameliorate, one or more of the disadvantages of existing arrangements, or at least provide a useful alternative to existing arrangements.

There is disclosed herein a juicer including:

a motorised base;

a collection container to be received by said base, the container having an opening to permit access to said container;

a lid to close said opening of said container, said lid having a feed tube to receive product to be juiced;

the motorised base having a surface adapted to receive said container and a drive mechanism protruding from said surface;

the container having an inner juice chamber and an outer pulp chamber that at least partially surrounds the inner juice chamber, with said inner juice chamber providing a wall portion to at least partially separate the inner juice chamber from the outer pulp chamber, the outer pulp chamber having an outer wall spaced from the wall portion;

a filter basket to be located within the container and in alignment with said feed tube to receive said product, the filter basket being rotatable about a central axis by the drive mechanism, the filter basket having a grating disc portion and a sieve portion, the grating disc portion being configured to separate the product into substantially solid product and liquid product such that the substantially solid product is ejected into the outer pulp chamber and the liquid product is ejected through the sieve portion into the inner juice chamber; and, a spout to discharge the liquid product from the container, the spout being integrally formed with the outer pulp chamber to extend from the wall portion at least partially separating the inner juice chamber and the outer pulp chamber, to the outer wall of the outer pulp chamber; wherein, the spout is located toward the opening of the container and oriented in a direction away from the grating disc.

Preferably, the spout is positioned above the grating disc.

Preferably, the inner juice chamber includes an inner wall and an inclined wall leading to a lower rim of the wall portion, the inclined wall urging the liquid product in the inner juice chamber towards the spout.

Preferably, the surface on the motorised base has a base surface and a stepped portion.

Preferably, the stepped portion has an upper surface spaced from the base surface by a height.

Preferably, the drive mechanism is located on the stepped portion, and the outer pulp container has a floor connecting the inner wall and the outer wall, the floor of the outer pulp chamber being locatable on the base surface.

Preferably, the container has a recess for receiving the stepped portion to position the container on the surface of the motorised base.

Preferably, the motorised base has a locating feature to locate the container with respect to the base.

Preferably, the filter basket has a rim locatable adjacent an extremity of the wall portion of the inner juice chamber, and an end portion adapted to engage with said drive mechanism through an opening in the inner wall, to rotate said basket about the central axis.

Preferably, the outer pulp chamber substantially surrounds the inner juice chamber.

Preferably, the inner juice chamber and the outer pulp chamber are arranged as substantially parallel concentric chambers.

Preferably, the spout extends along an axis that is transverse of the central axis.

Preferably, the motorised base has a plurality of foot portions to support the base, the plurality of foot portions being spaced from the surface from which the drive mechanism protrudes.

Preferably, the juicer includes a pusher to cooperate with the feed tube to urge product through the tube towards the grating disc.

Preferably, the feed tube includes at least one guide portion to assist the pusher in urging the product through the feed tube.

Preferably, the juicer includes a safety mechanism to lock the lid, the container, and the base together, with the safety mechanism being pivotally coupled to the base.

Preferably, the safety mechanism is in the form of a locking bar that pivots between a locking position to a released position.

Preferably, the container and the lid have at least one complementary locking member, said members engagable with said safety mechanism to lock the lid, the container and the base together.

Preferably, said locking members include at least one male portion engagable with a complementary female portion.

Preferably, said member on said lid includes a camming surface to receive a portion of said safety mechanism.

There is disclosed herein a juicer including:

a motorised base;

a collection container to be received by said base, the container having an opening to permit access to said container;

a lid having a feed tube to receive product to be juiced, said lid to close said opening of said container;

the motorised base having a plurality of foot portions to support the base, the plurality of foot portions being spaced from a surface of the base from which protrudes a drive mechanism, the surface adapted to receive said container;

the container having an inner juice chamber and an outer pulp chamber that substantially surrounds the inner juice chamber, with said inner juice chamber providing a wall portion to at least partially separate the inner juice chamber from the outer pulp chamber;

a filter basket to be located within the container and in alignment with said feed tube to receive said product, the filter basket having a rim locatable adjacent an extremity of the wall portion of the inner juice chamber and an end portion adapted to engage with said drive mechanism through an inner wall opening of the container, with the drive mechanism configured to rotate said basket about a central axis;

the filter basket having a grating disc portion and a sieve portion, the disc portion being configured to separate product into substantially solid product and liquid product, with the substantially solid product being ejected past the rim into the outer pulp chamber, and the liquid product being ejected through the sieve portion into the inner juice chamber; and the outer pulp chamber having a floor connecting an inner wall and an outer wall, and wherein the floor is locatable in a direction away from the drive mechanism and towards the feet.

Preferably, the base surface includes a stepped portion.

Preferably, the stepped portion has a surface that is spaced from the base surface by a height.

Preferably, the drive mechanism is located on one part of the stepped portion, and the floor of the outer pulp chamber is locatable on another part of the stepped portion.

Preferably, the base includes a locating feature to locate the container with respect to the base.

Preferably, the inner juice chamber includes an elongate spout to discharge the liquid product from the container, said spout being located in a direction away from the grating disc portion and towards the opening of the container.

Preferably, the spout extends along an axis that is transverse of the central axis.

Preferably, the inner juice chamber includes an inner wall and an inclined wall leading to a lower rim of the wall portion, the inclined wall urging the liquid product in the inner juice chamber towards the spout.

Preferably, the inner juice chamber and the outer pulp chamber are arranged as substantially parallel concentric chambers.

Preferably, the juicer includes a pusher to cooperate with the feed tube to urge product through the tube towards the grating disc.

Preferably, the feed tube includes at least one guide portion to assist the pusher in urging product through the feed tube.

Preferably, the juicer includes a safety mechanism to lock the lid, the container, and the base together, with the safety mechanism being pivotally coupled to the base.

Preferably, the safety mechanism is in the form of a locking bar that pivots between a locking position to a released position.

Preferably, the container and lid have at least one complimentary locking member, said members engagable with said safety mechanism to lock said lid, container and base together.

Preferably, said locking members include at least one male portion engagable with a complementary female portion.

Preferably, said member on said lid includes a camming surface to receive a portion of said safety mechanism.

Preferably, said container includes a stop member to limit pivoting of said safety mechanism.

There is disclosed herein a juicer including:

a motorised base;

a collection container to be received by said base, the container having an opening to permit access to said container;

a lid having a feed tube to receive product to be juiced, said lid to close said opening of said container;

the motorised base having a surface from which protrudes a drive mechanism and adapted to receive said container;

the container having an inner juice chamber and an outer pulp chamber that substantially surrounds the inner juice chamber, with said inner juice chamber providing a wall portion to at least partially separate the inner juice chamber from the outer pulp chamber; and a filter basket to be located within the container and in alignment with said feed tube to receive said product, the filter basket having a rim locatable adjacent an extremity of the wall portion of the inner juice chamber and an end portion adapted to engage with said drive mechanism through an inner wall opening of the container, with the drive mechanism configured to rotate said basket about a central axis.

Preferably, the filter basket includes a grating disc portion and a sieve portion, the disc portion being configured to separate product into substantially solid product and liquid product, with the substantially solid product being ejected past the rim into the outer pulp chamber, and the liquid product being ejected through the sieve portion into the inner juice chamber.

Preferably, the outer pulp chamber has a floor connecting an inner wall and an outer wall, and wherein the floor is locatable in a direction away from the drive mechanism and towards the feet.

Preferably, the motorised base includes a plurality of foot portions to support the base, the plurality of foot portions being spaced from a surface of the base from which protrudes a drive mechanism.

There is also disclosed herein a juicer including:

a motorised base;

a collection container to be received by said base, the container having an opening to permit access to said container;

a lid having a feed tube to receive product to be juiced, said lid to close said opening of said container;

the motorised base having a surface adapted to receive said container and a drive mechanism protruding from said surface;

the container having an inner juice chamber and an outer pulp chamber that at least partially surrounds the inner juice chamber, with said inner juice chamber providing a wall portion to at least partially separate the inner juice chamber from the outer pulp chamber; and a filter basket to be located within the container and in alignment with said feed tube to receive said product, the filter basket being adapted to engage the drive mechanism to rotate said basket about a central axis.

There is also disclosed herein a juicer including:

a motorised base;

a collection container to be received by said base, the container having an opening to permit access to said container;

a lid having a feed tube to receive product to be juiced, said lid to close said opening of said container;

the motorised base having a surface adapted to receive said container and a drive mechanism protruding from said surface;

the container having an inner juice chamber and an outer pulp chamber that at least partially surrounds the inner juice chamber, with said inner juice chamber providing a wall portion to at least partially separate the inner juice chamber from the outer pulp chamber;

a filter basket to be located within the container and in alignment with said feed tube to receive said product, the filter basket being adapted to engage the drive mechanism to rotate said basket about a central axis;

the base surface including a stepped portion having a surface that is spaced from the base surface by a height; and the drive mechanism being located on the surface of the stepped portion, and a floor of the outer pulp chamber being located on the base surface.

BRIEF DESCRIPTION OF THE DRAWINGS

Preferred embodiments of the present invention will be described by way of example only, with reference to the accompanying drawings, in which.

DETAILED DESCRIPTION OF EMBODIMENTS

Figure 1:
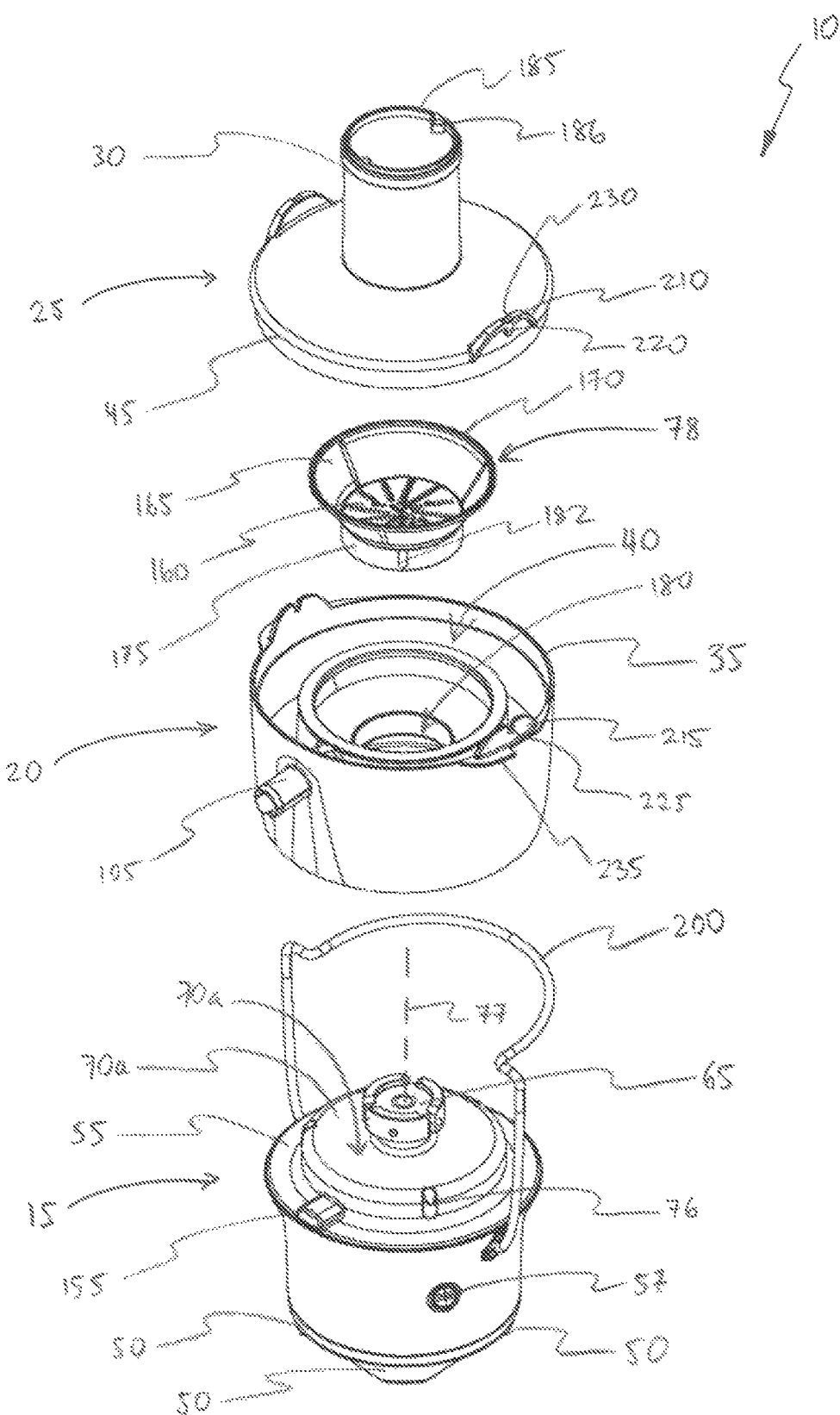
FIG. 1 is a schematic exploded isometric view of a juicer.

In FIGS. 1 to 6 of the accompanying drawings, there is schematically depicted a juicer 10 including a motorised base 15, a container 20 to be received by the base 15, and a lid 25 having a feed tube 30 to receive product (not shown) to be juiced. For the purpose of this specification, it will be understood that a wide variety of food and vegetable products may be juiced by the juicer 10. Throughout the specification, the term "product" will be used to designate any of these unless otherwise specified.

The container 20 provides a rim portion 35 surrounding an opening 40 that receives product to be juiced. The lid 25 also includes a rim portion 45 that engages the rim portion 35 of the container 20 to provide a cover for the opening 40, the lid 25 thereby closing the opening 40.

The base 15 includes a plurality of foot portions 50 to support the base 15. The foot portions 50 may have a rubberised surface to grippingly engage a countertop surface and minimise lateral movement or vibration of the juicer 10 during operation. The base 15 also includes a base surface 55 that is spaced from the foot portions 50 by a distance 60 (see FIG. 3).

The base 15 further includes a power button or switch 57 that is operatively associated with a drive mechanism 65. The power button or switch 57 is actuatable by a user to operate the drive mechanism 65. The drive mechanism 65 protrudes from the base surface 55 and into the container 20, with the base surface 55 being adapted to engage and receive the container 20. In particular, the base surface 55 includes a stepped portion 70 that is received within a recess 75 in the container 20 (see FIGS. 6 and 7). As will be discussed in further detail below, the complementary stepped portion 70 and recess 75 allow the container 20 to be aligned and mounted in the correct position with respect to the base 15. In the embodiment depicted in FIG. 1, the stepped portion 70 includes one or more pads 76 to cushion or absorb vibrations of the container 60 during operation of the juicer 10. The stepped portion 70 is provided with a surface 70a that is spaced from the base surface 55 by a distance 70b.

The drive mechanism 65 is configured to rotate about a central axis 77 to thereby drive rotation of a filter basket 78 (discussed in further detail below) about the axis 77.

The container 20 includes an inner juice chamber 80 and an outer pulp chamber 85 that at least partially surrounds the inner juice chamber 80. In a preferred form, the outer pulp chamber 85 substantially surrounds the inner juice chamber 80. The inner juice chamber 80 and the outer pulp chamber 85 are thus arranged as substantially parallel concentric chambers. The inner juicer chamber 80 and the outer pulp chamber 85 are at least partially separated by a wall portion 90. The inner juice chamber 80 further includes an inner wall 95 and intermediate wall 100 spaced from the inner wall 95. In the depicted embodiment, the intermediate wall 100 extends from the inner wall 95 and is inclined by an angle α relative to the inner wall 95. The intermediate wall 100 is also inclined by a complementary angle α relative to the wall portion 90. Accordingly, the inner wall 95 is provided with a frustoconical arrangement.

Figure 5:
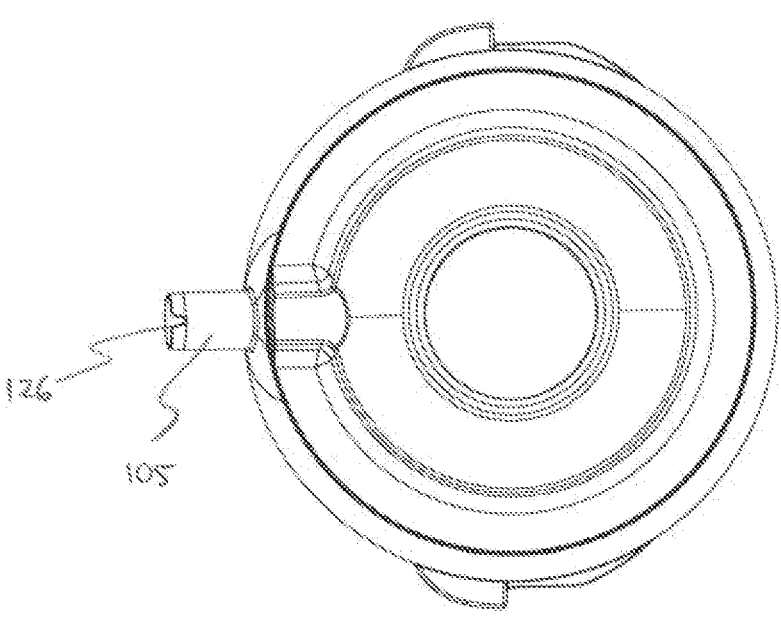
FIG. 5 is a schematic bottom elevation view of a container of the juicer of FIG. 1.
Figure 9:
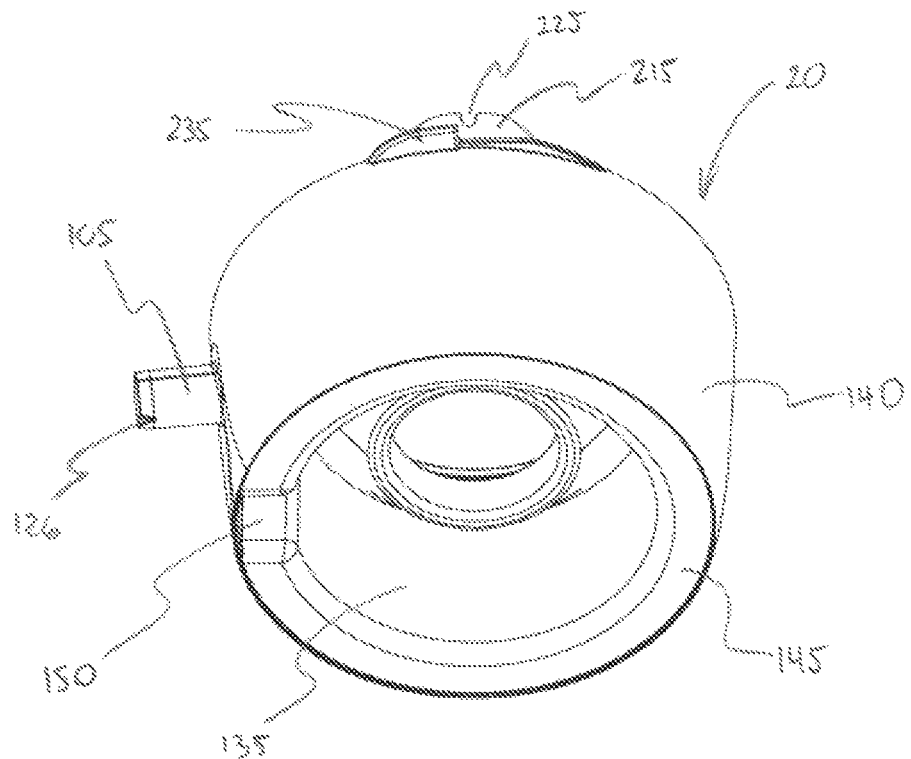
FIG. 9 is a schematic isometric view of the container of FIG. 7.
Figure 10:
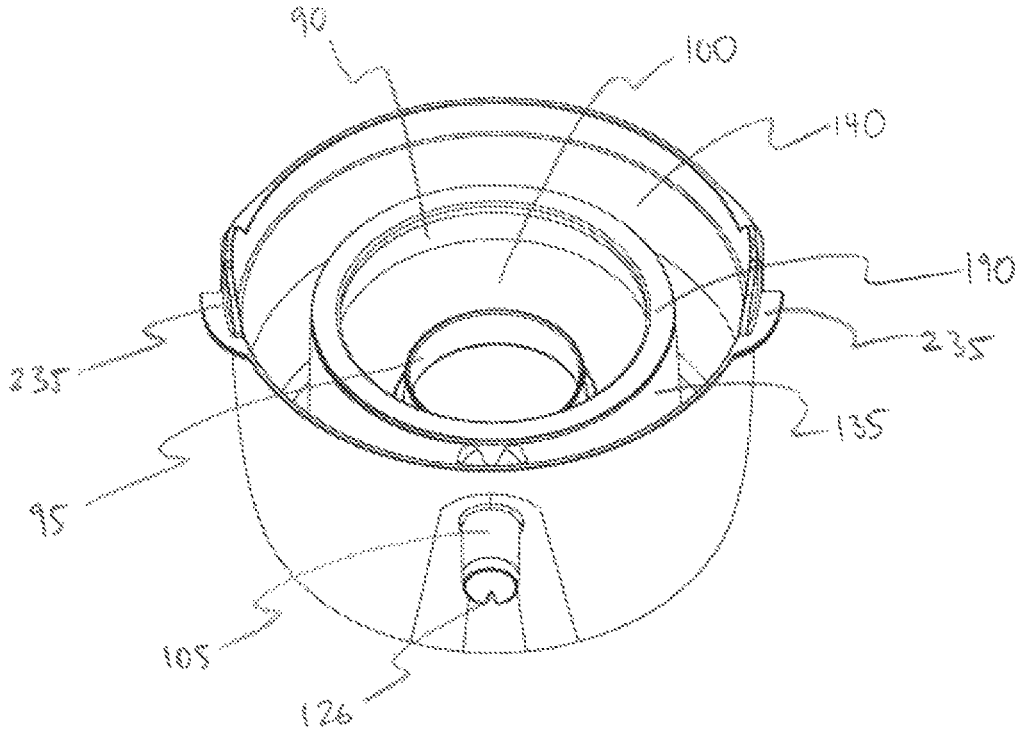
FIG. 10 is a further schematic isometric view of the container of FIG. 7.
Figure 11:
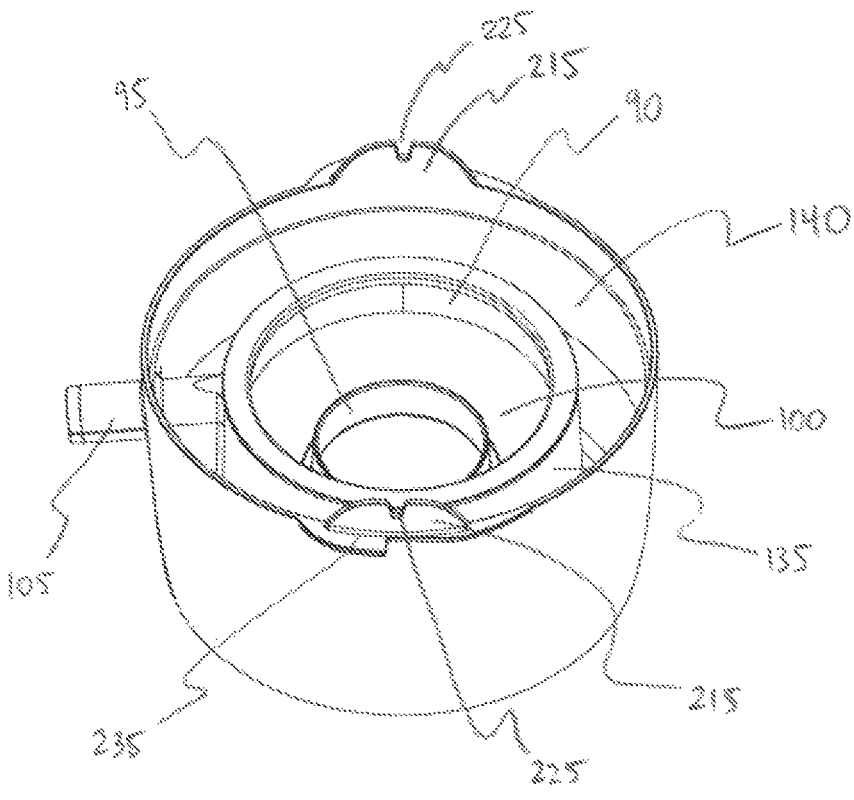
FIG. 11 is a further schematic isometric view of the container of FIG. 7.

The inner juice chamber 80 is also provided with an elongate spout 105 to discharge liquid product from the inner chamber 80. The elongate spout 105 provides a channel 110 that extends along an axis 115 from a chamber opening 120 to a spout opening 125. As shown in the depicted embodiment, the axis 115 extends transversely with respect to the central axis 77. In the preferred form, the axis 115 extends downwardly, at an acute angle with respect to the central axis 77. It will be appreciated that the acute angle of extension of the channel 110 facilitates the discharge of liquid product from the inner chamber 80 to a vessel (not shown) that is placed below the spout opening 125. As best shown in FIGS. 5, 9 and 10 the elongate spout 105 includes a notch 126 to facilitate the discharge of liquid product from the spout opening 125 into the vessel.

Figure 3:
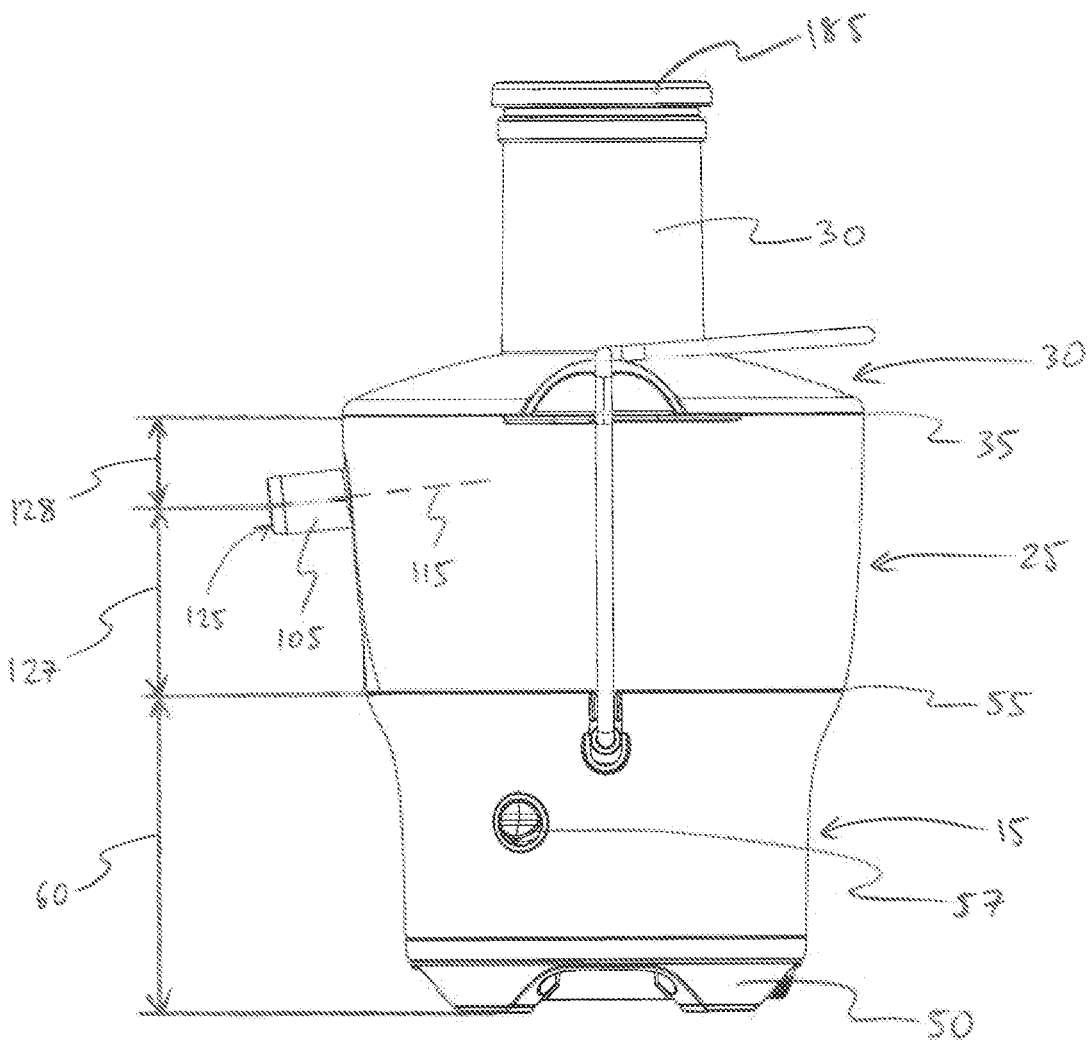
FIG. 3 is a schematic side elevation view of the juicer of FIG. 1.
Figure 4:
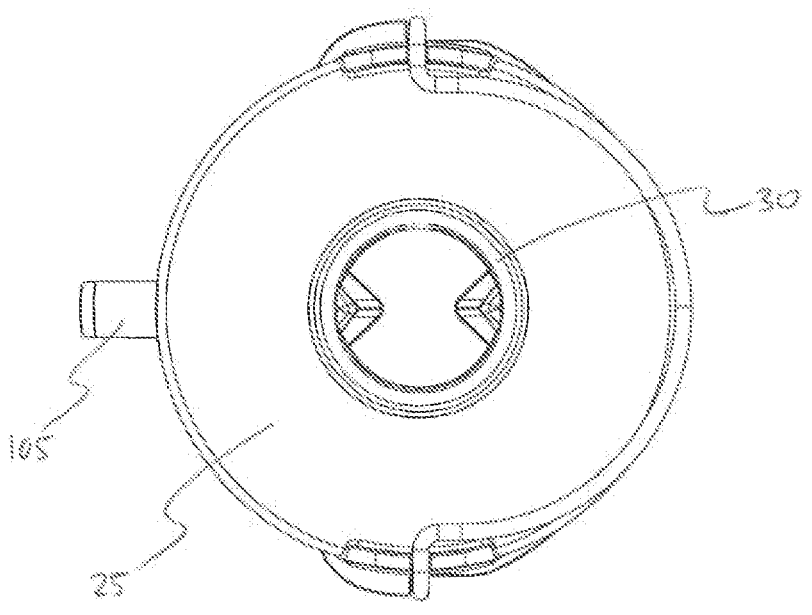
FIG. 4 is a schematic top elevation view of the juicer of FIG. 1.

Referring to FIG. 3, the axis 115 (taken at the location of the spout opening 125) is spaced from the base surface 55 by a distance 127. It will be appreciated that the sum of the distance 60 (between the foot portions 50 and the base surface 55) and the distance 127 (between the base surface 55 and the spout opening 125) provides a sufficient height to accommodate a large vessel or glass, for example, a vessel that is capable of holding 2 L of liquids or a tall glass. The axis 115 is also spaced from the rim portion 40 of the container 20 by a distance 128.

Returning to FIGS. 6 and 7, the wall portion 90 of the inner juicer chamber 80 extends in a first (downward) direction 130 (see FIG. 6) to also provide an inner wall 135 of the outer pulp chamber 85. The outer pulp chamber 85 also includes an outer wall 140 and a floor 145 that extends between the inner and outer walls 135 and 140. The inner and outer walls 135 and 140 are thus spaced apart by a gap to define the outer pulp chamber 85. The floor 145 is located away from the drive mechanism 65 and spaced apart by a distance 147 when the container 20 is assembled on the base 15. It will be appreciated that the floor 145 engages and abuts the base surface 55 when the container 20 is assembled on to the base 15. The floor 145 is also located below the surface 70a of the stepped portion 70. The floor 145 is also located below the inner wall 95, the intermediate wall 100, and the wall portion 90 of the inner juice chamber 80. It will be appreciated that the various walls and floors of the inner juice chamber 80 and outer pulp chamber 85 may be integrally formed (e.g. by way of moulding) to provide the container 20 as a singular part. Accordingly, the cost and complexity of manufacturing the various parts may be reduced.

Figure 12:
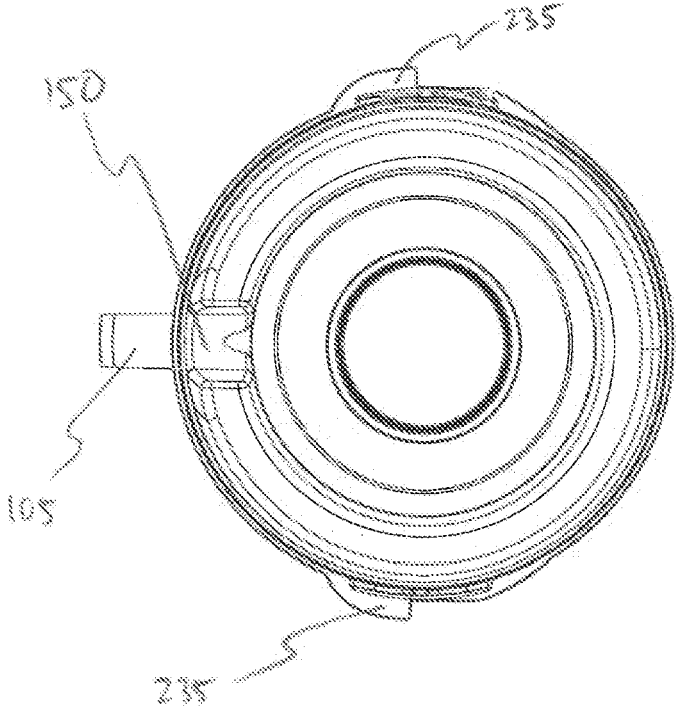
FIG. 12 is a schematic top elevation view of the container of FIG. 7.

As best shown in FIGS. 9 and 12, the container 20 includes a female locating feature 150. The base surface 55 of the base 15 includes a complementary male locating feature 155 (see FIGS. 1 and 6) to engage the female locating feature 150, so as to assist in correctly locating the container 20 with respect to the base 15. In the depicted embodiment, the female locating feature 150 and the male locating feature 155 extend radially outwardly from the central axis 77.

Returning to FIG. 1, the juicer 10 further includes the filter basket 78 that is locatable within the container 20. The filter basket 78 is mounted at least partially within the inner juice chamber 80 (see FIG. 6), and in alignment with the feed tube 30 and the central axis 77 of the drive mechanism 65. The filter basket 78 includes a grating disc portion 160 and a frustoconical sieve portion 165. As discussed above, the drive mechanism 65 is configured to drive rotation of the filter basket 78 about the central axis 77. The drive mechanism 65 may also be configured to drive rotation of the grating disc portion 160 or the sieve portion 165 in isolation. The filter basket 78 includes a rim 170 that is locatable adjacent the wall portion 90 and an end portion 175 adapted to engage the drive mechanism 65 through an inner wall opening 180 of the container 20. It will be understood and appreciated that the rim 170 is located above the height of the grating disc portion 160. The rim 170 is also located above the height of the wall portion 90. The inner wall opening 180 is provided by the inner wall 95 of the inner juice chamber 80. The end portion 175 of the filter basket 78 includes an alignment feature 182 to facilitate the correct location and mounting of the filter basket 78 within the container 20.

The grating disc portion 160 is configured to separate the product that is fed through the feed tube 30 into substantially solid product (i.e. pulp) and liquid product (i.e. juice). During operation of the juicer 10, the product is fed through the feed tube 30, and engages the grating disc portion 160, which grates or shreds the product as it is rotated by the drive mechanism 65. The resultant solid product (which will be larger than the holes provided in the sieve portion 165 and thus unable to travel therethrough) is then ejected upwardly along the inclined sieve portion 165, over the rim 170 and into the outer pulp chamber 85. The resultant liquid product (which will be able to flow through the holes in the sieve portion 165) will be ejected through the sieve portion 165 and into the inner juice chamber 80. The liquid product that falls into the inner juice chamber 80 then travels upwardly along the inclined intermediate wall 100, and into the channel 100 of the spout 105. The liquid product can then be discharged from the spout opening 125 and into a collection vessel. It will be appreciated that the upward travel of the liquid product from the inner juice chamber 80 into the channel 100 along the intermediate wall 100 is encouraged by airflow that is generated by the rotating filter basket 78.

Figure 6:
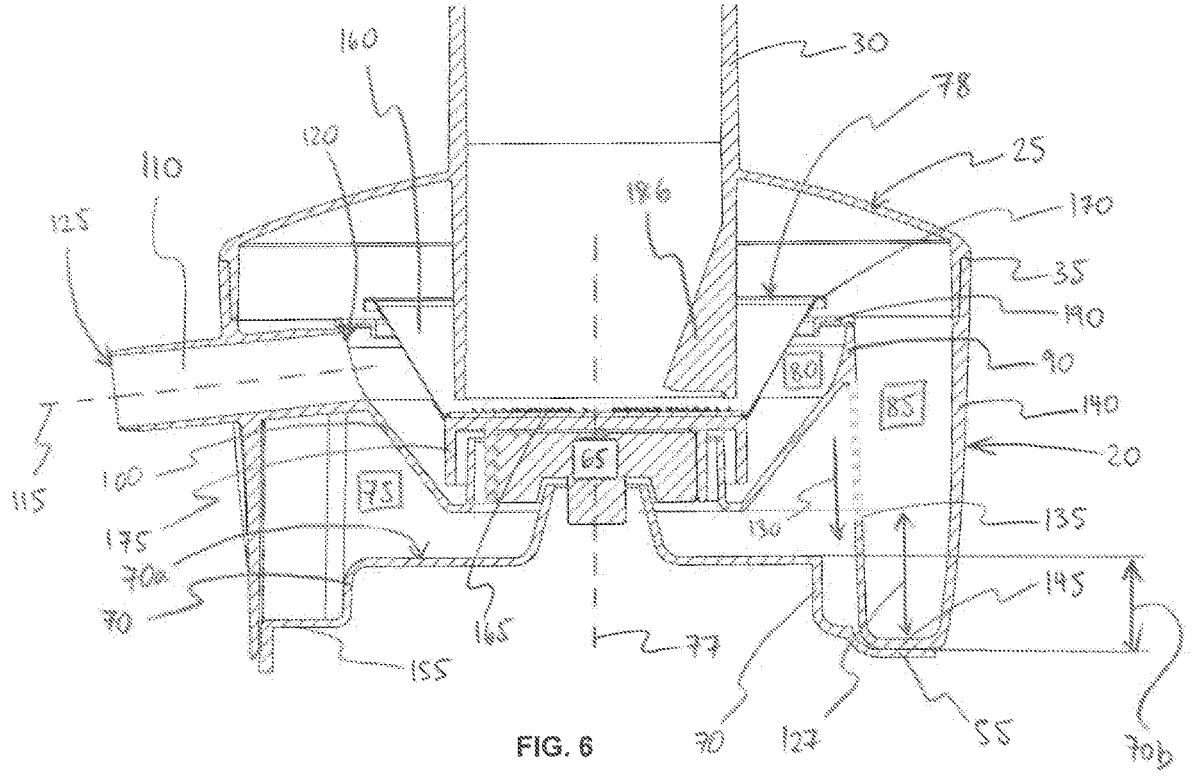
FIG. 6 is an enlarged schematic side cross-sectional view of a section of the juicer of FIG. 1.
Figure 7:
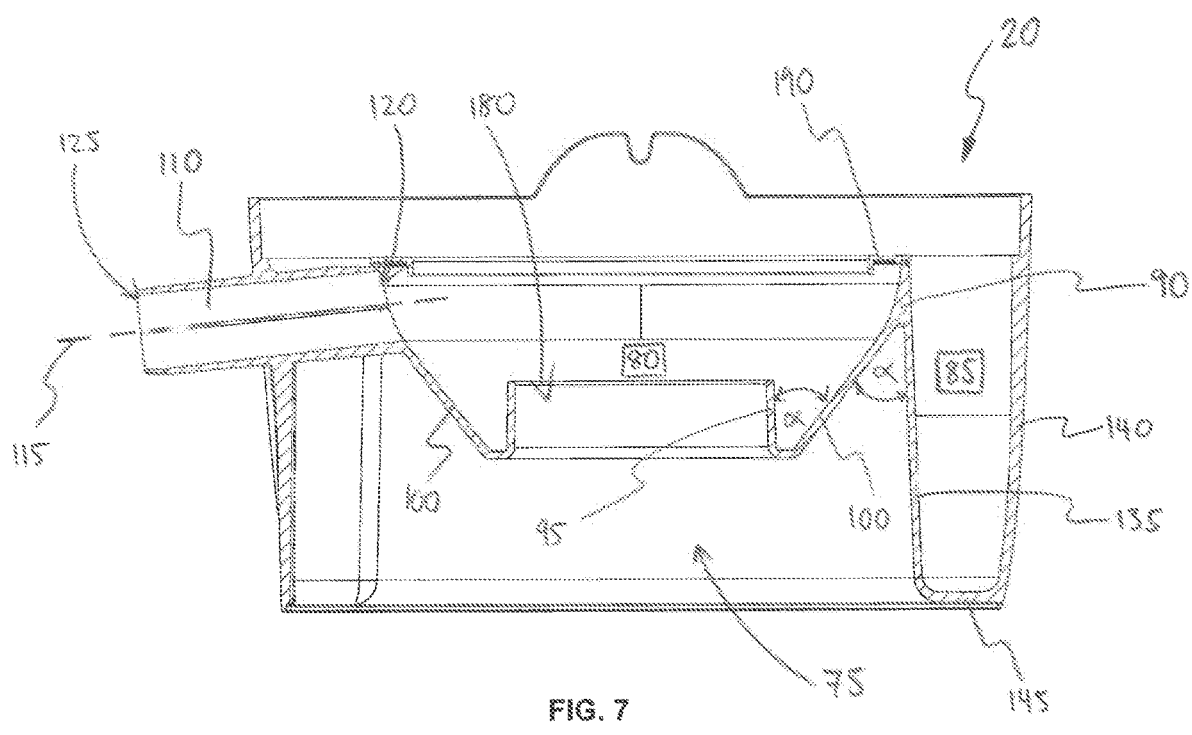
FIG. 7 is an enlarged schematic side cross-sectional view of a section of the container of FIG. 5.
Figure 8:
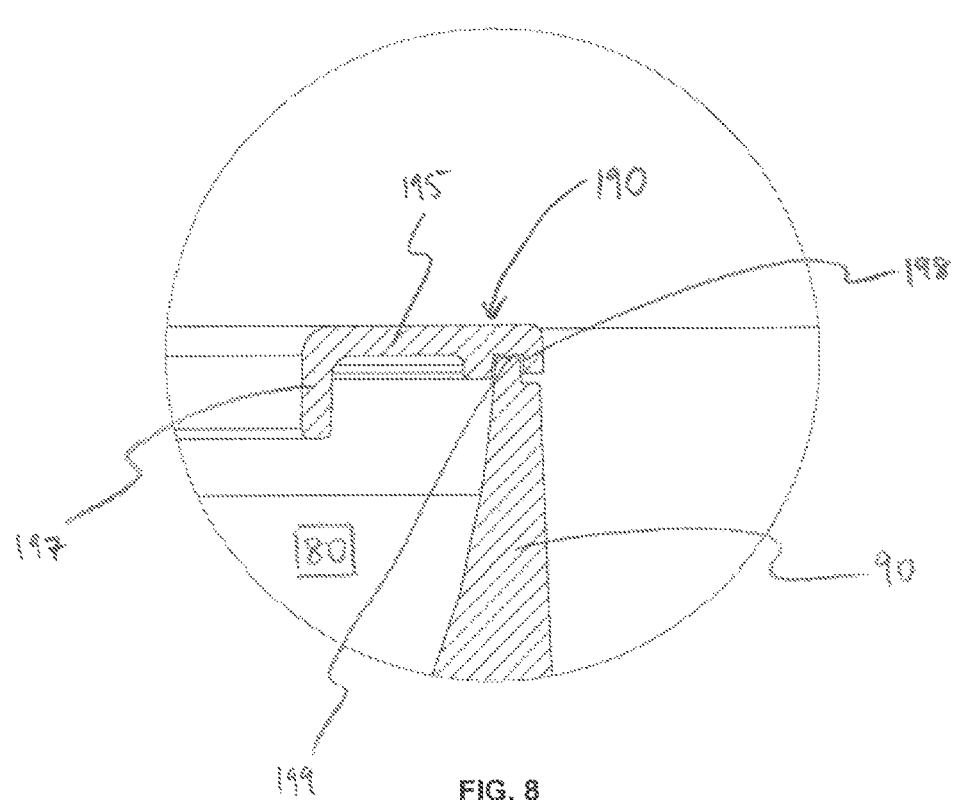
FIG. 8 is an enlarged view of a portion of the container of FIG. 7.
Figure 13:
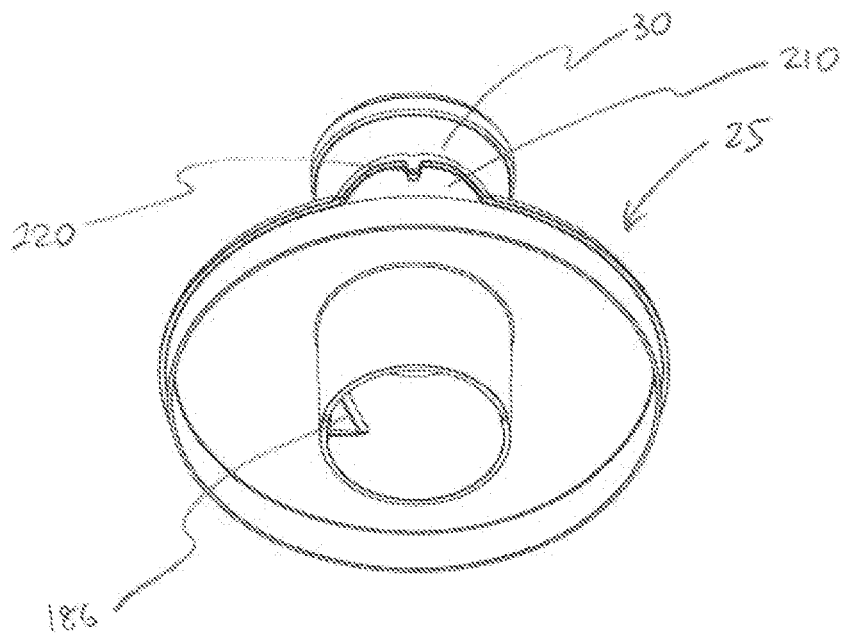
FIG. 13 is a schematic isometric view of a lid of the container of FIG. 1.
Figure 14:
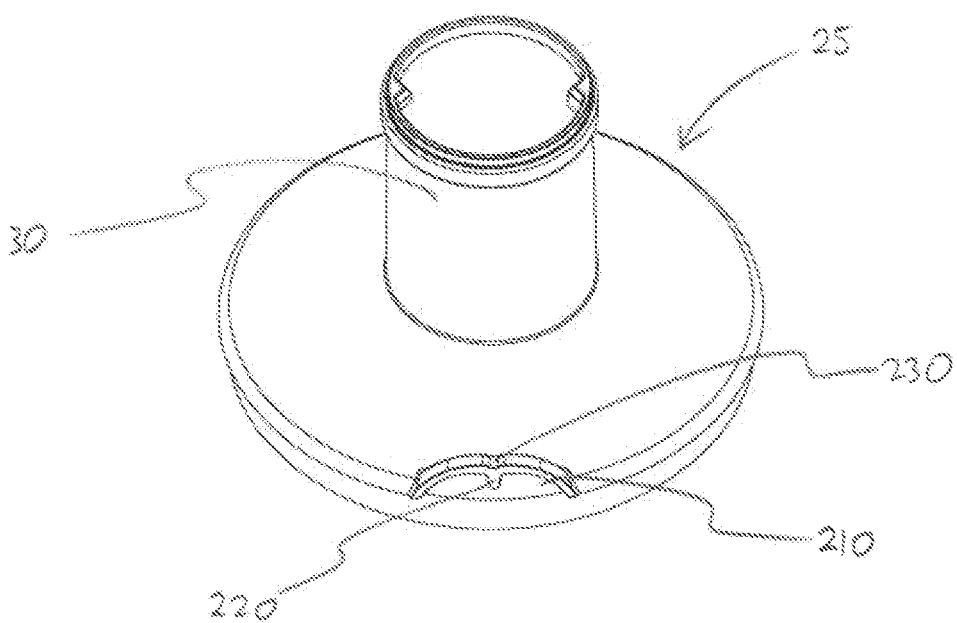
FIG. 14 is a further schematic isometric view of the lid of FIG. 13.

It will be appreciated that the juicer 10 may further include a pusher 185 that cooperates with the feed tube 30 and adapted to urge the product through the feed tube 30 towards the grating disc portion 160. Referring to FIGS. 6 and 13, the feed tube 30 may further include a guide portion 186 to assist the pusher 185 in urging the product through the feed tube 30 and towards the grating disc portion 160. The feed tube 30 may also include pusher stabilisers 187 that assist to guide and stabilise the pusher 185 as it is inserted into the feed tube 30.

As best shown in FIGS. 6 to 8 and 10, a retention member 190 is provided above the wall portion 90 but below the rim 170 of the filter basket 78. The retention member 190 has a first portion 195 extending transversely from the wall portion 90, and a second portion 197 extending transversely from the first portion 195. The retention member 190 also includes a recess 198 to engage the wall portion 90, and to facilitate induction or ultrasonic welding of the retention member 190 to the wall portion 90. With induction welding, for example, a wire (not shown) is placed between the retention member 190 and the wall portion 90 and is heated via induction, so as to melt the surrounding material of the retention member 190 and the wall portion 90 (which would typically be plastic). The retention member 190 and the wall portion 90 would then be fused together to form an integral part of the container 20. Alternatively, with ultrasonic welding, the retention member 190 and the wall portion 90 are fused together by heat from energy that is produced by ultrasonic vibration. A small triangular rib 199 (see FIG. 8) is used as an energy director to focus the heat on the location/joint at which the retention member 190 and the wall portion 90 are to meet. It will be appreciated that the retention member 190 blocks the upward travel of liquid product from the inner juice chamber 80 into the outer pulp chamber 85, which would otherwise unnecessarily waste liquid product that is able to be consumed. The retention member 190 also prevents the travel of substantially solid product that is ejected from the filter basket from entering the inner juice chamber 80 by shielding the exposed portion of the inner juice chamber 80.

Figure 2:
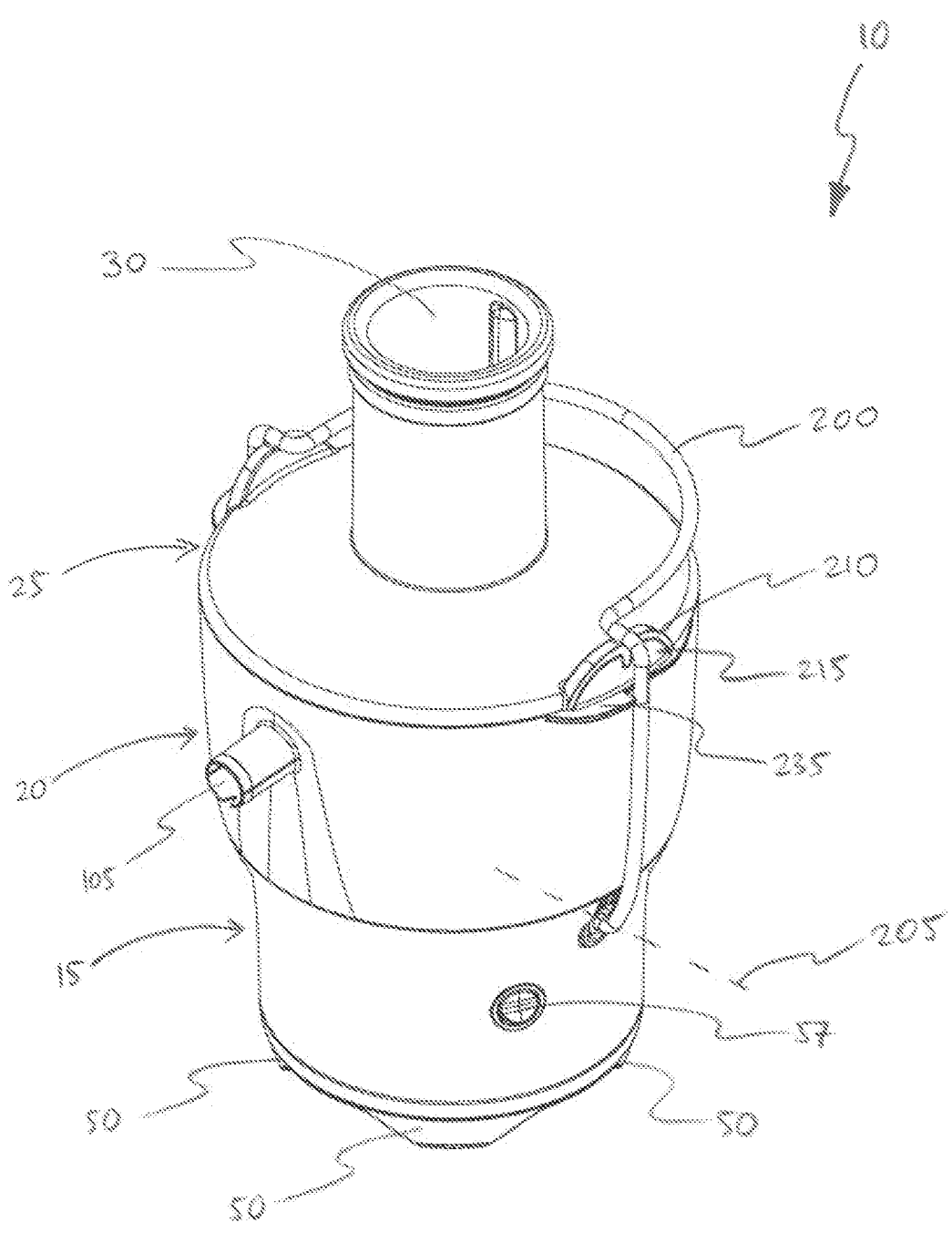
FIG. 2 is a schematic isometric view of the juicer of FIG. 1.

Returning to FIGS. 1 and 2, the juicer 10 may further include a safety mechanism in the form of a locking bar 200 that is pivotally coupled to the base 15. The locking bar 200 is configured to pivot about a locking bar axis 205 (see FIG. 2) to a locking position as shown in FIGS. 1 and 2, so as to lock the lid 25 and the container 20 with respect to the base 15. The lid 25 includes a lid locking portion 210 and the container 20 includes a complementary container locking portion 215. The lid locking portion 210 and the container locking portion 215 engage one another so as to facilitate the mounting of the lid 25 with respect to the container 20. As best shown in FIG. 1, the lid locking portion 210 includes at least one male portion 220 that is engageable with a complementary female portion 225 on the container locking portion 215. The locking portions 210 and 215 also engage the locking bar 200 to facilitate the locking of the lid 25 and container 20 with respect to the base 15. In particular, the lid locking portion 210 includes a camming surface 230 to receive a portion of the locking bar 200. The locking bar 200 is also pivotable to a released position (not shown), whereby the locking bar 200 is no longer in contact with the camming surface 230, so that the lid 25, the container 20, and the base 15 are free to be released for disassembly from one another. The container 20 may also further include a stop member 235 that extends outwardly from the outer wall 140. The stop member 235 limits the pivoting of the locking bar 200 so as to prevent the locking bar 200 from unnecessarily contacting the feed tube 30.

Various forms of the juicer and components thereof described above may have one or more of the following advantages. For example, the outer pulp chamber of the container is uniquely deep, as it extends below the height of the drive mechanism. The depth of the outer pulp chamber is facilitated, at least in part, by the stepped portion of the base and the complementary configuration of the inner walls. The cooperating arrangement of filter basket, the wall portion and the inclined intermediate wall of the inner juice chamber also facilitate the dispensation of liquid product into the spout. The arrangement of the retention member at the upper portion of the inner juice chamber also prevents the liquid product from escaping the inner juice chamber and into the outer pulp chamber, thereby minimising wasted liquid product. The various components of the container (inner juice chamber, outer pulp chamber, retention member) may also be integrally formed by way of moulding and induction or ultrasonic welding, so as to reduce the number of separate components that need to be assembled together. The arrangement of the inner juice chamber and the outer pulp chamber as described above also enable the spout to be located at a higher distance from the foot portions of the base (compared to conventional juicers), thereby providing an increased height of the spout opening to accommodate the collection of dispensed juice in a larger vessel or glass without comprising on the footprint of the juicer.

Although the invention has been described with reference to preferred embodiments, it will be appreciated by those persons skilled in the art that the invention may be embodied in many other forms.

The invention claimed is:

1. A juicer including:
    a motorised base;
    a collection container to be received by said base, the container having an opening to permit access to said container;
    a lid to close said opening of said container, said lid having a feed tube to receive product to be juiced;
    the motorised base having a surface adapted to receive said container and a drive mechanism protruding from said surface;
    the container having an inner juice chamber and an outer pulp chamber that at least partially surrounds the inner juice chamber, with said inner juice chamber providing a wall portion to at least partially separate the inner juice chamber from the outer pulp chamber, the outer pulp chamber having an outer wall spaced from the wall portion;
    a filter basket to be located within the container and in alignment with said feed tube to receive said product, the filter basket being rotatable about a central axis by the drive mechanism, the filter basket having a grating disc portion and a sieve portion, the grating disc portion being configured to separate the product into solid product and liquid product such that the solid product is ejected into the outer pulp chamber and the liquid product is ejected through the sieve portion into the inner juice chamber; and,
    a spout to discharge the liquid product from the container, the spout being integrally formed with the outer pulp chamber to extend from the wall portion at least partially separating the inner juice chamber and the outer pulp chamber, to the outer wall of the outer pulp chamber; wherein the spout is located toward the opening of the container and oriented in a direction away from the grating disc and the spout is positioned above the grating disc.

2. The juicer according to claim 1, wherein the inner juice chamber includes an inner wall and an inclined wall leading to a lower rim of the wall portion, the inclined wall urging the liquid product in the inner juice chamber towards the spout.

3. The juicer according to claim 2, wherein the surface on the motorised base has a base surface and a stepped portion.

4. The juicer according to claim 3, wherein the stepped portion has an upper surface spaced from the base surface by a height.

5. The juicer according to claim 4, wherein the drive mechanism is located on the stepped portion, and the outer pulp container has a floor connecting the inner wall and the outer wall, the floor of the outer pulp chamber being locatable on the base surface.

6. The juicer according to claim 5, wherein the container has a recess for receiving the stepped portion to position the container on the surface of the motorised base.

7. The juicer according to claim 2, wherein the filter basket has a rim locatable adjacent an extremity of the wall portion of the inner juice chamber, and an end portion adapted to engage with said drive mechanism through an opening in the inner wall, to rotate said basket about the central axis.

8. The juicer according to claim 1, wherein the motorised base has a locating feature to locate the container with respect to the base.

9. The juicer according to claim 1, wherein the outer pulp chamber surrounds the inner juice chamber.

10. The juicer according to claim 9, wherein the inner juice chamber and the outer pulp chamber are arranged as parallel concentric chambers.

11. The juicer according to claim 1, wherein the spout extends along an axis that is transverse of the central axis.

12. The juicer according to claim 1, wherein the motorised base has a plurality of foot portions to support the base, the plurality of foot portions being spaced from the surface from which the drive mechanism protrudes.

13. The juicer according to claim 1, wherein the juicer includes a pusher to cooperate with the feed tube to urge product through the tube towards the grating disc.

14. The juicer according to claim 1, wherein the feed tube includes at least one guide portion to assist the pusher in urging the product through the feed tube.

15. The juicer according to claim 1, wherein the juicer includes a safety mechanism to lock the lid, the container, and the base together, with the safety mechanism being pivotally coupled to the base.

16. The juicer according to claim 15, wherein the safety mechanism is in the form of a locking bar that pivots between a locking position to a released position.

17. The juicer according to claim 16, wherein the container and the lid have at least one complementary locking member, said members engagable with said safety mechanism to lock the lid, the container and the base together.

18. The juicer according to claim 17, wherein said locking members include at least one male portion engagable with a complementary female portion.

19. The juicer according to claim 17, wherein said member on said lid includes a camming surface to receive a portion of said safety mechanism.

* * * * *